E. M. CONKLING.
Hoe.
No. 68,047.  Patented Aug. 27. 1867.
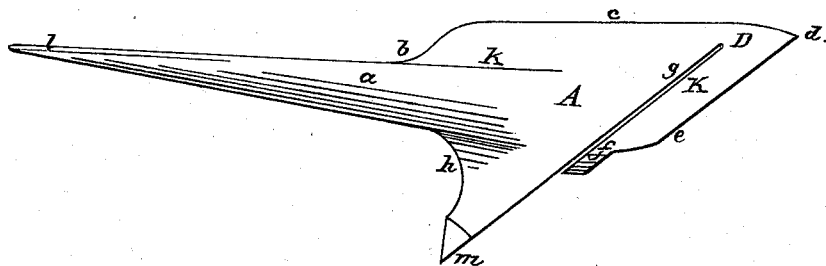
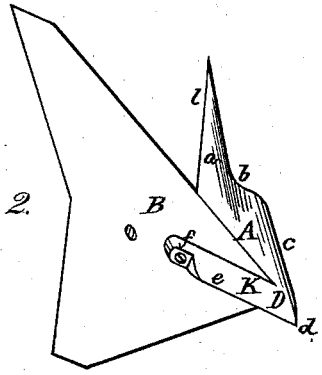
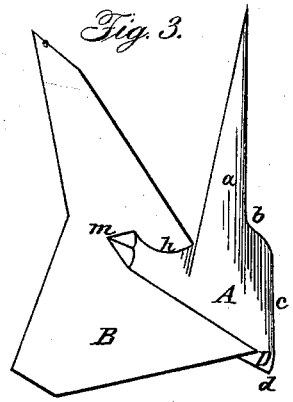
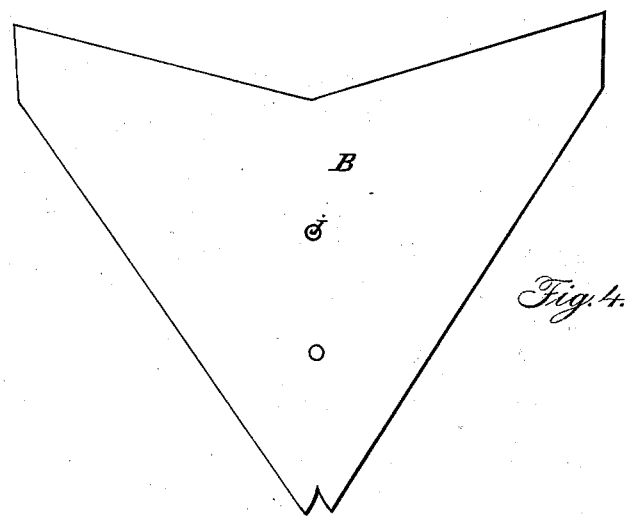
Witnesses:
J. G. Chase
Ogden Griswold
Inventor:
Eleazer M. Conkling
by his attys
Buckland & Curtis

United States Patent Office

ELEAZER M. CONKLING, OF PARMA, NEW YORK.

Letters Patent No. 68,047, dated August 27, 1867.

---

IMPROVEMENT IN WEEDING-HOE.

---

*The Schedule referred to in these Letters Patent and making part of the same.*

---

TO ALL WHOM IT MAY CONCERN:

Be it known that I, ELEAZER M. CONKLING, of Parma, in the county of Monroe, and State of New York, have invented a new and useful improvement in agricultural implements for tilling and dressing the soil, which I denominate a Universal Weeding-Hoe; and I do hereby declare that the following is a full and exact description thereof, reference being had to the accompanying drawings and to the letters of reference marked thereon, making a part of this specification, whereof—

Figure 1 is a side elevation of the shank and keel of said hoe.

Figures 2 and 3 are perspective views of said hoe taken in different positions; and Figure 4 is a plan of the blade of said hoe.

The nature of my invention consists in constructing an implement of such form that it can be moved forward or backward in the earth at a little distance below the surface, so as to answer the purpose of a hoe of common form in cutting off weeds and plants, and in dressing the soil, and at the same time obviate the necessity of lifting the hoe from the earth with every forward movement of the operator. The ground is also left in a smoother condition than in the use of a hoe of common form, and the destruction of weeds is more thorough.

The construction of my invention is as follows: The main parts of the implement are three in number, viz: first, a blade; second, a shank for the handle, a coulter and keel all formed in one piece; and third, a wooden handle, not shown. The blade B is formed of a plate of iron or steel of proper thickness, and of such shape as to present six cutting edges, all bevelled from the upper side of the plate B. The two front edges form, (if produced until they meet,) a salient angle, and the two rear edges form a re-entrant angle, while the two shorter side edges are parallel to one another and to the line of the keel, and the arrangement of the six cutting edges as to position is designed to make the operation of the implement easy and efficient. Holes *j j* allow the insertion of two screws, hereafter mentioned. I have also constructed the blade of a slightly different form, by continuing the front edges further back, about three-fourths of an inch or more, so that the side edges would no longer be parallel, but would meet in the rear, if produced, and by then turning up a triangular portion of the blade on each side at a right angle, and to the height of three-fourths of an inch or more. The vertical projections thus made serve as a gauge and guide, and may be added to the flat blade, represented in the drawings, at little cost. The piece A may be made of wrought or cast metal, but I prefer to construct it of malleable iron. A shank, *a*, ending in a point, *l*, is formed upon the upper end of the piece A, and this shank is designed to enter a wooden handle of the usual form. I have also constructed a socket for the handle in place of the pointed shank *a*. A cutting edge, *c*, is formed upon the piece A, extending from a point, *b*, upon the front side of the shank *a* to the point *d*. This portion which projects beyond the line of the shank *a*, I denominate a coulter. To prevent weeds and earth from lodging between the rear of the shank and the blade, and also to strengthen the hoe, a portion of A is prolonged in the rear of the shank to *m*. The upper edge of this prolongation is curved, as at *h*, and has a sharp edge to facilitate the backward movement of the hoe. An essential part of my invention is the keel K, extending beneath the blade from the point *d* to the point *f*, and having a cutting edge along its lower side from the point *d* to the narrower portion at *f*. A screw, *i*, passes through a hole in this thinner portion, and through the blade into the piece A above the slot *g*, and adds to the rigidity of the keel. The slot *g* is formed for the reception of the blade B. In actual construction I have found it desirable to forge or cast the piece A without a slot, and afterwards to cut the slot *g* in the same by sawing or any suitable operation. The blade B is then inserted in the slot *g* and fastened to the piece A by screws *i* and *i'*. The angular opening *o* in the blade B also serves to prevent lateral movement of the forward part of the blade in the slot. The shank *a* being inserted in a wooden handle the hoe is ready for use.

The operation of my invention is as follows: The blade having entered the earth can be easily pushed forward or drawn back without lifting it, and can also be moved laterally, if desired. It can be pushed or drawn along near drills or rows of plants more steadily and uniformly than drill-hoeing can be performed with the common hoe. From the angular arrangement of the cutting edges, the cutting off of roots or stalks will be effected by a drawing cut and not a direct cut as with the common hoe. The keel extending downward along a portion of the middle line of the blade, serves not only to penetrate and open the earth beneath the blade, but also to enable the operator to move the implement easily and steadily in any desired direction. The coulter presents a strong cutting edge to any root or stalk before it, and cleaves the earth for the passage of the blade.

The operation of hoeing or dressing the soil becomes, by the use of this implement, a steady and easy movement, instead of the alternate raising and lowering of the common hoe, and the process is less fatiguing to the operator, and leaves the soil in better condition.

I do not claim broadly the angular arrangement of the cutting edges of the blade as distinguished from a blade of rectangular form. Nor do I claim a blade so hung or mounted as to move horizontally beneath the earth's surface as the same appears in the Letters Patent, No. 25,619, granted unto H. H. Baker, October 4, 1859; and I disclaim any and every part of the invention of said Baker, as set forth in said Letters Patent.

What I claim as my invention, and desire to secure by Letters Patent, is—

1. The combination of the coulter and keel formed in one piece with the blade B, all constructed and arranged substantially as described.

2. The blade B, having its front edges arranged so as to form, if produced, a salient angle, and its rear edges so as to form a re-entrant angle, substantially as described.

Witness my hand this 2d day of April, A. D. 1867.

ELEAZER M. CONKLING.

Witnesses:
   E. C. BROWN,
   S. P. TRIPP.